(12) United States Patent
Ioelovich et al.

(10) Patent No.: US 8,268,391 B2
(45) Date of Patent: Sep. 18, 2012

US008268391B2

(54) BIODEGRADABLE NANO-COMPOSITION FOR APPLICATION OF PROTECTIVE COATINGS ONTO NATURAL MATERIALS

(75) Inventors: Michael Ioelovich, Haifa (IL); Oleg Figovsky, Haifa (IL); Alexander Leykin, Haifa (IL)

(73) Assignees: Nanotech Industries, Inc., Daly City, CA (US); Polymate, Ltd., Migdal Ha'emeq (IL)

( * ) Notice: Subject to any disclaimer, the term of this patent is extended or adjusted under 35 U.S.C. 154(b) by 663 days.

(21) Appl. No.: 12/381,564

(22) Filed: Mar. 13, 2009

(65) Prior Publication Data

US 2010/0233468 A1    Sep. 16, 2010

(51) Int. Cl.
*B05D 1/24* (2006.01)

(52) U.S. Cl. ............ 427/212; 536/56; 536/57; 536/126; 536/123.1; 536/124; 536/123.12; 106/163.01

(58) Field of Classification Search ................. 427/212; 536/56, 57, 126, 123.1, 124, 123.12; 106/163.01
See application file for complete search history.

(56) References Cited

U.S. PATENT DOCUMENTS

| | | | |
|---|---|---|---|
| 3,970,629 A | 7/1976 | Izaki et al. | |
| 3,985,937 A | 10/1976 | Fife | |
| 4,117,199 A | 9/1978 | Gotoh et al. | |
| 4,365,029 A | 12/1982 | Reizer | |
| 4,395,499 A | 7/1983 | Rosenski et al. | |
| 4,657,821 A | 4/1987 | Ura et al. | |
| 4,863,655 A | 9/1989 | Lacourse et al. | |
| 5,053,268 A | 10/1991 | Ehara et al. | |
| 5,296,307 A | 3/1994 | Bernstein | |
| 5,350,627 A * | 9/1994 | Nemphos et al. | 442/153 |
| 5,362,776 A | 11/1994 | Barenberg et al. | |
| 5,587,246 A | 12/1996 | Tsutsumi et al. | |
| 5,707,741 A | 1/1998 | Hoenel et al. | |
| 6,030,673 A | 2/2000 | Andersen et al. | |
| 6,103,790 A * | 8/2000 | Cavaille et al. | 524/13 |
| 6,117,545 A * | 9/2000 | Cavaille et al. | 428/357 |
| 6,255,375 B1 | 7/2001 | Michelman | |
| 6,541,627 B1 * | 4/2003 | Ono et al. | 536/56 |
| 6,723,264 B1 | 4/2004 | Bussey, Jr. | |

OTHER PUBLICATIONS

Dodson C.T, et al, *Journal of Pulp and Paper Science*, 1996, 22, J165-169.
Sampson W.W., *Journal of Materials Science*, 36, 5131-5135.
M. Ioelovich in *Scientific Israel—Technological Advantages*, 2001, vol. 3, No. 2, pp. 152 to 157.
Hubbe, et al, *BioResources*, 2008, 3 (3), pp. 929 to 980.

\* cited by examiner

*Primary Examiner* — Leszek Kiliman
(74) *Attorney, Agent, or Firm* — Haynes and Boone, LLP; Pavel I. Pogodin

(57) ABSTRACT

The invention relates to a method for manufacturing a biodegradable composition containing nano-particles of cellulose for forming a protective coating on natural materials. It is an object of the invention to provide a composition for forming a protective coating layer on a biodegradable natural material that imparts to the material improved waterproofing and grease-resistant properties. It is another object to provide a composition for forming a protective coating on natural biodegradable materials that is based on the use of nano-cellulose particles and that protects these materials from swelling, warping, and mechanical damage during contact with water, other aqueous liquids, or grease.

25 Claims, No Drawings

BIODEGRADABLE NANO-COMPOSITION FOR APPLICATION OF PROTECTIVE COATINGS ONTO NATURAL MATERIALS

FIELD OF THE INVENTION

The invention relates, generally, to protective coating compositions for application onto environmentally friendly, biodegradable, compostable, and recyclable natural materials and, more particularly, to biodegradable nano-compositions used as protective coatings for application onto natural packaging materials in order to protect such materials against penetration of water and grease.

BACKGROUND OF THE INVENTION

Conventional disposable packaging and service items such as containers, trays, plates, bowls, and others, are commonly made from polystyrene or other synthetic hydrophobic plastics and also from paper or paperboard coated commonly with polyethylene. These materials are durable and are moisture-resistant and grease-resistant. The items are produced by industry in great quantities and are relatively inexpensive. After usage, these biostable packaging items are discarded in the environment and therefore create serious ecological problems. The expected lifetime of polystyrene packaging, for example, is approximately 500 years. Further, polystyrene and other plastics are made from nonrenewable petroleum resources. Recycling of plastic items is an expensive process. Moreover, recycled plastics are prohibited as a material for production packaging for food. In China, for example, the use of polystyrene foam in disposable packaging is illegal.

The pressure to use biodegradable disposable packaging materials has steadily increased in the last decade. The main approach in the art has been the manufacture of compostable and inexpensive food-service items such as containers, trays, plates and bowls based on biodegradable and natural raw materials such as starch, cellulose, proteins, etc. U.S. Pat. No. 4,863,655 issued in 1989 to N. Lacourse et al., U.S. Pat. No. 5,362,776 issued in 1994 to S. Barenberg, et al., U.S. Pat. No. 6,030,673 in 2000 to P. J. Andersen, et al. and U.S. Pat. No. 6,723,264 issued in 2004 to H. Bussey, Jr. disclose materials containing a starch binder, reinforcing cellulose fibers, and additives for obtaining compostable and biodegradable food packaging. Production methods of the disclosed materials are also described.

However, packaging based on natural biodegradable materials has several disadvantages, the most important being susceptibility to water, grease, and various other liquids. A starch binder is water-soluble and penetrable to grease. Cellulose and proteins are hydrophilic and therefore swell in water. When exposed to water or significant amounts of water vapor, these packaging items lose form-stability and become susceptible to breakage. Water, grease, and other liquids, as well as gases and vapors, easily penetrate natural materials because of high porosity of these materials. It is known that paper and other natural materials contain pores with diameters of dozens of microns (Dodson C. T, et al, *Journal of Pulp and Paper Science*, 1996, 22, J165-169; Sampson W. W., *Journal of Materials Science*, 36, 5131-5135).

Currently, various approaches are proposed to solve the problem of moisture and grease susceptibility of packaging made from natural materials. One approach is to protect the packaging from contact with water or other liquids by applying hydrophobic films onto surfaces of the packaging material and forming a laminated or coated structure in which a liquid-sensitive core is sandwiched between layers of synthetic hydrophobic plastics or resins.

Such protected layers may contain various compounds, e.g., polyolefins and additives (U.S. Pat. No. 5,296,307 issued in 1994 to B. Bernstein), copolymers of olefins and unsaturated carboxylic acids, and pigments (U.S. Pat. No. 3,970,629 issued in 1976 to N. Izaki, et al.), and a mixture of polyvinyl chloride and ethylene-acrylic copolymer (U.S. Pat. No. 4,365,029 issued in 1983 to R. Reizer). U.S. Pat. No. 5,053,268 issued in 1991 to R. Ehara, et al. discloses paper containing sheets of synthetic film and paper bonded with a urethane adhesive. All these materials are water- and grease resistant but are not biodegradable.

U.S. Pat. No. 3,985,937 issued in 1976 to R. Fife, U.S. Pat. No. 4,117,199 issued in 1978 to H. Gotoh, et al., U.S. Pat. No. 4,395,499 issued in 1983 to J. Rosenski, et al., U.S. Pat. No. 4,657,821 issued in 1987 to S. Ura, et al., U.S. Pat. No. 5,587,246 issued in 1996 to H. Tsutsumi, et al., and U.S. Pat. No. 6,255,375 issued in 2001 to J. Michelman relate to protection of cellulose substrates and disclose hydrophobic coatings that contain synthetic rubbers, polyvinyl esters, polyacrylates, various copolymers, paraffin wax, organic acids, fillers, and other additives. The coated materials are waterproof; however their biodegradability is low and, therefore, they pollute the environment.

Latexes (aqueous polymer dispersions) cannot be used in protective coatings of hydrophilic natural materials containing cellulose, protein, or starch because of swelling, warping, and dissolving of these natural materials, when they come into contact with an aqueous type of latex during the coating process.

Lamination of cellulose, paper, or other natural packaging materials with synthetic polymers or resins prevents recycling and composting thereof. When a laminate is discarded, it pollutes the environment. Moreover, the valuable raw materials of the laminate are lost.

Some hydrophobic biodegradable polymers and co-polymers such as poly-beta-hydroxyalkanoates (PHA) have been used as laminating layers for cellulose materials (Ioelovich M., *Scientific Israel—Technological Advantages*, 2001, Vol. 3, No. 2, pp. 152 to 157). These polymers or co-polymers contain ester links that can be destroyed by environmental microorganisms. PHA in a melted state was applied to the cellulose substrate at temperatures above 150 to 160° C. After cooling, a solid water-resistant PHA layer was formed on the cellulose substrate. Nowadays, such polymers and co-polymers of a PHA type are produced in small amounts from rare raw materials. The manufacturing technology is complicated, and thus the cost of such materials is high (tens of USD per kg). It should be pointed out that the biodegradation process of PHA is relatively slow. For example, destruction of PHA in soil takes more than eight months. Furthermore, the application of PHA to cellulose substrate at the above-mentioned temperatures is associated with thermal destruction of the substrate. The use of PHA or other biodegradable polymers as protective coatings is very expensive, and the application, itself, is difficult. In other words, use of these polymers increases manufacturing cost of the final packaging product. Films of biodegradable polymers usually have poor protective and mechanical properties. Moreover, natural packaging material laminated or coated with biodegradable polymer films cannot be recycled.

The coating of cellulose substrate by aqueous dispersions (types of latex) of PHA is known in the art (U.S. Pat. No. 5,350,627 issued in 1994 to S. Nemphos, et al.). The cellulose substrate is impregnated with PHA latex and is then dried at room temperature and pressed for a few minutes at 100 to 140° C., i.e., at a temperature below the melting point of PHA. Because of low temperature and short period of time, thermal destruction of cellulose can be avoided. However, since PHA particles do not melt, it is not possible to obtain a monolithic and homogeneous coating. As a result, the coated paper has loose, porous polymer layers and therefore has low resistance to penetration of water and other liquids. Another disadvantage of the above-mentioned method is the necessity to treat the paper with a dilute aqueous dispersion of PHA (5 to 20% or 50 to 200 g/l). This causes considerable swelling, warping, and possible mechanical damage of the initial hydrophilic and porous cellulose substrate during later steps in the production process. Moreover, PHA-dispersion is an expensive product.

Also, it should be noted that use of nano-cellulose particles for the preparation various nano-compositions is known. Current methods for the production of nano-cellulose and nano-cellulose-based compositions consist of hydrolysis of amorphous domains of elementary fibrils with high concentrated (60 to 65%) sulfuric acid and subsequent mechanical or ultrasound disintegration (U.S. Pat. No. 6,117,545 issued in 2001 to J. Cavaille, et al, U.S. Pat. No. 6,103,790 in 2000 to J. Cavaille; Ono, et al, U.S. Pat. No. 6,541,627 issued in 2003 to H. Ono, et al.; and Hubbe, et al, *BioResources*, 2008, 3 (3), pp. 929 to 980). The main disadvantages of these methods for producing cellulose nano-particles are the use of acids of high concentration, a low yield of nano-particles, and a low solid content of nano-dispersions. Nano-composites produced by mixing a diluted water dispersion of nano-cellulose with polymer latex have poor properties due to provision of a weak van der Waals interaction only between the cellulose nano-particles and the polymer binders.

Thus, despite availability of various manufacturing methods for protective coatings, there remains a strong belief in the need for a new and improved production process of biodegradable nano-compositions for protective coatings of natural packaging materials.

OBJECTS AND SUMMARY OF THE INVENTION

It is an object of the invention to provide a composition for forming a protective coating layer on a biodegradable natural material that imparts to the material improved waterproofing and grease-resistant properties. It is another object to provide a composition for forming a protective coating on natural biodegradable materials that is based on the use of nano-cellulose particles and that protects these materials from swelling, warping, and mechanical damage during contact with water, other aqueous liquids, or grease. It is a further object to provide a method for application of protective coatings onto natural biodegradable materials for reliably protecting such materials from swelling, warping, and mechanical damage during contact with water, other aqueous liquids, or grease.

The invention is based on idea to solve the problem of susceptibility of natural materials to penetration of water and other liquids, by filling the pores on the surface of the natural biodegradable packaging material with fine barrier particles. Because paper and other natural materials contain micron-scale pores, filling of these micro-pores with protective biodegradable nano-scale particles closes the pores and thus makes the natural materials stable against penetration of water and other liquids. Nano-particles of cellulose in combination with some other additives appeared to be most suitable for the purposes of the invention.

More specifically, the method of the invention for manufacturing a protective coating composition containing nano-cellulose particles comprises the following steps of:
 (a) pretreating cellulose with a sodium hypochlorite solution having pH in the range of 8 to 11 thus obtaining a pretreated cellulose;
 (b) hydrolyzing the pretreated cellulose with a boiling mineral acid having a concentration of 10 to 30 wt. % thus obtaining an acidic wet cake that contains agglomerates of nano-cellulose particles;
 (c) introducing at least one precipitator into the obtained acidic wet cake containing agglomerates of nano-cellulose particles, the precipitator being capable of forming with the residual mineral acid water-insoluble processing aids that precipitate into the acidic wet cake and are capable of reducing pH of the acidic wet cake to the range of 7 to 8;
 (d) admixing the wet cake, which contains the agglomerates of the nano-cellulose particles and water-insoluble processing aids, with a solution containing a hydrophobic biodegradable polymer, additives of a biodegradable plasticizer, and a natural hydrophobizator soluble in organic solvents; and
 (e) homogenizing the obtained mixture of the wet cake that contains agglomerates of nano-cellulose particles, the water-insoluble processing aids, the solution containing the hydrophobic biodegradable polymer, the additives of biodegradable plasticizer, and the natural hydrophobizator in order to break out agglomerates of nano-particles and to obtain a uniform composition having an average particle size in the range 50 to 300 nm.

A protective coating composition of the invention comprises 1 to 5 wt. % of a nano-cellulose; 20 to 50 wt. % of a biodegradable polymer; 1 to 5 wt. % of a processing aids; 2 to 10 wt. % of a biodegradable plasticizer; 1 to 3 wt. % of a natural hydrophobizator, 5 to 10 wt. % of water, and 30 to 60 wt. % of an organic solvent.

In accordance with one aspect of the invention, the coating composition contains nano-particles having an average size of 50 to 300 nm.

In accordance with another aspect of the invention, viscosity of the composition ranges from 100 to 2,000 cP.

The dry weight of the protective coating on the surface of the natural material used as a base material should be in the range from 10 to 50 g/m$^2$ of the base material.

A natural material (cellulose, paper, cardboard, starch or protein composites, etc.) coated with a protective coating acquires good barrier properties against penetration of water, grease, and various other liquids. Also, a natural material coated with a protective nano-composition is biodegradable, compostable, and recyclable.

DETAILED DESCRIPTION OF THE INVENTION

The invention relates to a method for manufacturing a biodegradable composition containing nano-particles of cellulose for forming a protective coating on natural materials made from paper, cardboard, starch, protein-based composites, cellulose fabrics, etc.

For better understanding of the invention and the purpose of the composition constituents, it is advantageous to define the terms used in the present specification.

The term "natural material" refers to any material or composite containing natural cellulose fibers, plant fibers, proteins, hemicelluloses, starch, and other natural polysaccharides used for the manufacture of packaging products. More specifically, the term "natural material" refers to a material selected in a non-limiting manner from paper-grade wood celluloses such as Kraft, soda and sulfite celluloses, non-bleached and bleached celluloses from hardwood and softwood; various natural cellulose fibers; recycled paper and cardboard; and scraps of paper, cardboard, and cellulose-based textiles materials.

The term "precipitator" refers to any agent that can interact with residual acid of the hydrolyzed cellulose and can form with the residual acid particles of water-insoluble processing aids that precipitate into slurry or a wet cake containing an agglomerate of nano-particles.

The term "processing aid" covers any admixture that imparts to the proposed compositions special properties, e.g., improved compatibility, opacity, or the like.

The term "water-insoluble processing aid" refers to any agent having solubility of approximately 0.2 g per 100 g of water, or less, at room temperature, where said "water-insoluble processing aids" are formed as a result of interaction of the "precipitator" with the residual acid of the hydrolyzed cellulose.

The term "compatibilizer" refers to any interfacial agent that facilitates formation of a uniform and phase-stable composition of polymers with other ingredients.

Pretreatment of inexpensive unbleached cellulose is carried out with a 5 to 10 wt. % solution of sodium hypochlorite at a liquid/cellulose ratio of 5 to 10 at room temperature or at a moderate temperatures (20 to 40° C.) for 30 to 90 min in the presence of a basic buffering agent (sodium bicarbonate, sodium hydrogen phosphate, etc.) providing a pH of 8 to 10, to obtain a white cellulose with a decreased degree of polymerization containing oxy-groups, mainly carboxyl groups in amounts of 6 to 25 wt. %.

In this invention, an unexpected result of bleaching under the above-stated conditions is a sharp decrease in concentration of sulfuric acid from 60-65 wt. % inherent in conventional methods of preparation of nano-cellulose (e.g., J. Cavaille, et al, U.S. Pat. No. 6,103,790 issued in 2000) to 10-30 wt. %.

Current methods in the manufacture of nano-cellulose employ hydrolysis with use of highly concentrated sulfuric acid only. In contrast, the method of the invention employs hydrolysis with both sulfuric and hydrochloric acid, or with a mixture of these acids.

Pretreatment under proposed conditions may result not only in bleaching but also in deep activation of the cellulose structure because of partial depolymerization and introduction of oxy-groups. Such structural changes of the pretreated cellulose may facilitate acid hydrolysis of amorphous domains of elementary nano-fibrils. Moreover, introduction of oxy-groups into the surface of cellulose nano-fibrils can hinder direct contact between adjacent nano-crystallites, thus preventing aggregation and promoting liberalization of free nano-crystalline particles during the hydrolysis process.

The invention is based on idea to solve the problem of susceptibility of natural materials to penetration of water and other liquids, by filling the pores on the surface of the natural biodegradable packaging material with fine barrier particles. Because paper and other natural packaging materials contain micron-scale pores, filling of these micro-pores with protective biodegradable nano-scale particles closes the pores and thus makes the natural materials stable against penetration of water and other harmful liquids. Nano-particles of cellulose in combination with some other additives appeared to be most suitable for the purposes of the invention.

More specifically, the method of the invention for manufacturing a protective coating composition containing nano-cellulose particles comprises the following steps of:

(a) pretreating cellulose with a sodium hypochlorite solution having pH in the range of 8 to 11 thus obtaining a pretreated cellulose;

(b) hydrolyzing the pretreated cellulose with a boiling mineral acid having a concentration of 10 to 30 wt. % thus obtaining an acidic wet cake that contains agglomerates of nano-cellulose particles;

(c) introducing at least one precipitator into the obtained acidic wet cake containing agglomerates of nano-cellulose particles, the precipitator being capable of forming with the residual mineral acid water-insoluble processing aids that precipitate into the acidic wet cake and are capable of reducing pH of the acidic wet cake to the range of 7 to 8;

(d) admixing the wet cake, which contains the agglomerates of the nano-cellulose particles and water-insoluble processing aids, with a solution containing a hydrophobic biodegradable polymer, additives of a biodegradable plasticizer, and a natural hydrophobizator soluble in organic solvents; and (e) homogenizing the obtained mixture of the wet cake that contains agglomerates of nano-cellulose particles, the water-insoluble processing aids, the solution containing the hydrophobic biodegradable polymer, the additives of biodegradable plasticizer, and the natural hydrophobizator in order to break out agglomerates of nano-particles and to obtain a uniform composition having an average particle size in the range 50 to 300 nm.

A protective coating composition of the invention comprises 1 to 5 wt. % of a nano-cellulose; 20 to 50 wt. % of a biodegradable polymer; 1 to 5 wt. % of a processing aids; 2 to 10 wt. % of a biodegradable plasticizer; 1 to 3 wt. % of a natural hydrophobizator, 5 to 10 wt. % of water, and 30 to 60 wt. % of an organic solvent.

In accordance with one aspect of the invention, the coating composition contains nano-particles having an average size of 50 to 300 nm.

In accordance with another aspect of the invention, viscosity of the composition ranges from 100 to 2,000 cP.

The dry weight of the protective coating on the surface of the natural material used as a base material should be in the range from 10 to 50 g/m$^2$ of the base material.

A natural material (cellulose, paper, cardboard, starch or protein composites, etc.) coated with a protective coating acquires good barrier properties against penetration of water, grease, and various other liquids. Also, a natural material coated with a protective nano-composition is biodegradable, compostable, and recyclable.

A concentration of sodium hypochlorite below 5 wt. % will decrease the activation rate of cellulose. On the other hand, a concentration of sodium hypochlorite exceeding 10 wt. % will not noticeably increase the activation rate. If during cellulose pretreatment with hypochlorite the pH level decreases below 7, this leads to hindering the activation process and reducing whiteness of the treated cellulose.

Addition of the basic buffering agent to the hypochlorite solution in amounts of 0.1 to 0.5 wt. % for maintaining the pH level in the range of 8 to 11 prevents decrease of the pH level and imparts stability to the cellulose activation process. Increasing the process temperature above 40° C. reflects negatively on the activation process and impairs whiteness of the pretreated cellulose.

Hydrolysis of non-dried pretreated cellulose results in obtaining an acidic wet cake of agglomerates of nano-particles. The acidic wet cake is diluted with water and squeezed. Then, a special precipitator is added to the squeezed wet cake in order to form with the residual acid particles of water-insoluble processing aids (e.g., compatibilizer, antiblocker, pigment, etc.), to as neutralize acidity, and to adjust the pH level to the range of 7 to 8. Such a precipitator causes the formed water-insoluble particles of the aids to precipitate into a wet cake that contains the agglomerates of nano-particles. The action of the precipitator and formation of a water-insoluble processing aid can be illustrated, for example, by interaction of sodium stearate (NaSt) as a precipitator with residual hydrochloric acid (HCl) of the acidic wet cake:

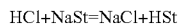

HCl+NaSt=NaCl+HSt

As a result of this interaction, a water-insoluble processing aid, stearic acid (HSt), is formed. Such a processing aid functions as a compatibilizer that improves compatibility of hydrophilic particles of nano-cellulose with hydrophobic polymer binder.

The wet cake containing nano-particles of cellulose and water-insoluble processing aid is admixed with a solution of biodegradable polymer and various other additives (e.g., a biodegradable plasticizer, hydrophobizer, etc.) that are soluble in organic solvents. The mixture is then disintegrated at room temperature in a high-speed homogenizer or disintegrator, e.g., in the lab homogenizer of MRC, the disintegrator of Silverson Co., the Gaulin-type high-pressure homogenizer produced by APV Co., the high-pressure homogenizer of Bee International Co.; an ultrasonic homogenizer, or the like.

The final nano-composition is used for coating a natural packaging material (such as paper, cardboard, starch or protein-based composites, etc.) by means of any coating method (a rod or knife coater, brushing, spraying, etc.) to fill surface pores of the material with nano-particles. Then the coated material is dried at an increased temperature to obtain the protective layer.

Listed below are commercially available chemicals and materials that can be used in practice as suitable constituents for the composition and method of the invention.

Sodium hypochlorite can be available from U.S. and European chemical companies: Delta Chemical Co., MD, USA; Vertex Chemical Co., MO, USA; PPG Industries, KY, USA; Orasico Trading Ltd., UK; Blieffoorts Eurogroup, Spain; and others. Biodegradable polymers, i.e. Polycaprolactone (PCL), can be obtained from Anderson Dev. Co., MI, USA; Durect Co., CA, USA; Dow Plastics, MI, USA; Perstorp UK Lim., UK; low molecular Polyvinyl Acetate (PVAc) from Wacker Chemie AG, Germany; Celanese Co., TX, USA; Synthomer, OH, USA; and Sigma-Aldrich, MO, USA; while low molecular Diacetate cellulose (DAC) from Eastman, TN, USA; Celanese, TX, USA; and Sigma-Aldrich, MO, USA.

Suitable biodegradable plasticizers-glycerol diacetate (Diacetin), glycerol triacetate (Triacetin); and glycol diacetate were available from Alfa Aesar, Mass., USA and Sigma-Aldrich, MO, USA.

Preferable commercially available natural hydrophobizators are natural waxes—Carnauba wax, Beeswax, Candelilla wax, and others available from Strohmeyer & Arpe Co., NJ, USA and Tromm GmbH, Germany, as well as natural fats, e.g. Stearin, can be available from ACH Food Companies Inc., NT, USA; ADM Co., IL, USA and some others.

Suitable salts of fatty acids can be available from ICC Chemical Co., NY, USA; Fox Chemicals GmbH, Germany; Viva Co., India and other companies.

Other suitable chemical—mineral acids, oxides, hydroxides, carbonates, basic silicates, organic solvents and some others were available from Sigma-Aldrich, MO, USA.

Kraft cellulose, paper and paperboard were available from International Paper Co., TN, USA and Weyerhaeuser Co., WA, USA. Starch-based packaging composite materials were available from Biosphere Industries, CA, USA and Hartmann Co., Denmark.

For testing structure and properties the following methods were implemented: Average degree of polymerization (DP) of cellulose was measured by means of viscosity of diluted solutions in cuproxam, while content of oxy-groups in cellulose was tested by standard methods of chemical analysis (D. Fengel and G. Wegener. Wood Chemistry, ultrastructure, reactions. Berlin, N.Y., 1984).

Particle size of the nano-compositions was studied by a means of a Mastersizer 2000 Apparatus of Malvern Instrument Ltd.

Viscosity of the compositions was measured by the Brookfield viscometer (of Brookfield Engineering, MA, USA) at a rotation rate of 20 rpm.

Water absorption of coated cellulose materials was determined by the Cobb test in accordance with ASTM D3285.

Biodegradability was assessed by weight loss of materials at composting in wet soil. The weight loss was measured under the composting conditions described in ASTM D2020-B and ASTM D5988.

In the following examples, the invention is described in more detail without limiting the scope of the application of the invention.

Practical Example 1

10 g of brown Kraft cellulose having DP=1100 was cut into pieces of 1 to 3 cm and placed in a 250-ml plastic jar. Sodium bicarbonate was dissolved in a 5 wt. % sodium hypochlorite in the amount of 0.1 g per 100 ml of the reagent. The buffered sodium hypochlorite having a pH level of approximately 8 was heated to 40° C. and poured into the jar to obtain a reagent/cellulose ratio of 10. The plastic jar was closed hermetically with a cover and was shaken by a lab shaker for 90 min. Then the pretreated cellulose was washed with water in a vacuum glass filter and squeezed to a water/cellulose ratio of approximately 3. The following result was obtained: 34 g of wet cake containing 8.5 g of pretreated cellulose having a white color, DP 570, and a content of carboxyl groups in a concentration of 8 wt. %.

The obtained wet cake was placed into a 300-ml laboratory glass reactor positioned in a silicon oil bath. Then 59.3 g of 43 wt. % sulfuric acid were added to the wet cake in order to obtain 30 wt. % concentration of the acid. The reactor was closed hermetically with a cover, heated to 80° C., maintained at this temperature for 30 min, and then cooled. The acidic slurry was transferred to a glass beaker, diluted with water to 10 wt. % sulfuric acid and squeezed in the glass filter to a liquid/solid ratio of 3. As a precipitator, sodium stearate was slowly added to the acidic wet cake during stirring to a pH level of 7.5. As a result, the sulfuric acid was neutralized and the processing aid, stearic acid, as a compatibilizer, was formed and precipitated into the wet cake.

The wet cake containing agglomerates of nano-cellulose and stearic acid was added to a 500-g solution containing 50 wt. % low-molecular weight (DP=200) polyvinyl acetate (PVAc), 1.2 wt. % of beeswax as the natural hydrophobizator, 5 wt. % of glycol diacetate (GDA) as the biodegradable plasticizer, and ethyl acetate (EA) as the organic solvent. Then this mixture was disintegrated by means of Gaulin-type homogenizer with 10 circulations at 100 MPa to obtain a biodegradable composition for use as a protective coating of natural packaging material.

The Mastersizer 2000 test showed that the prepared composition contained nano-particles with an average size of 240 nm. This composition comprised the following amounts of ingredients: 1.2 wt. % of nano-cellulose, 2.1 wt. % of compatibilizer (stearic acid), 46 wt. % of biodegradable polymer (PVAc), 1.1 wt. % of natural hydrophobizator (beeswax), 4.6 wt. % of biodegradable plasticizer (GDA), 40.3 wt. % of organic solvent (EA), and 4.7 wt. % of water. Brookfield's viscosity of the composition was 250 cP.

Practical Example 2

15 g of brown Kraft cellulose having DP=1100 was cut into pieces of 1 to 3 cm and placed in a 250-ml plastic jar. Sodium hydrogen phosphate was dissolved in 10 wt. % sodium hypochlorite in the amount of 0.5 g per 100 ml of the reagent. The buffered sodium hypochlorite having a pH level of 10 was poured into the jar to obtain a reagent/cellulose ratio of 5. The plastic jar was closed hermetically with a cover and was shaken by a lab shaker at 20° C. for 30 min. Then the pretreated cellulose was washed with water in a vacuum glass filter and squeezed to a water/cellulose ratio of 3. The following result was obtained: 46 g of wet cake containing 11.6 g of pretreated cellulose having a white color, DP 480, and a content of carboxyl groups in a concentration of 15 wt. %.

This wet cake was placed into a 300-ml laboratory glass reactor positioned in a silicon oil bath. Then 81 g of 28.6 wt. % sulfuric acid were added to the wet cake in order to obtain a 20-wt. % concentration of the acid. The reactor was closed hermetically with a cover, heated to 100° C., maintained at this temperature for 40 min., and then cooled. The acidic slurry was transferred to a glass beaker, diluted with water to 7 wt. % sulfuric acid, and squeezed in the glass filter to a liquid/solid ratio of 3. Then, as a precipitator, calcium stearate was slowly added to the acidic wet cake during stirring to a pH level of 7.1. As a result, the sulfuric acid was neutralized and the processing aids, stearic acid, as a compatibilizer and calcium sulfate as a white pigment, were formed and precipitated into the wet cake.

The wet cake containing agglomerates of nano-cellulose and processing aids was added to a 500-g solution containing 30 wt. % low-molecular (DP=240) diacetate cellulose (DAC), 2 wt. % of stearin as a natural hydrophobizator, and 7 wt. % of triacetin as a biodegradable plasticizer, in an organic solvent-ethyl acetate/ethanol mixture of 1:1. Then this mixture was disintegrated by means of Gaulin-type homogenizers with 10 circulations at 100 MPa to obtain a biodegradable composition for use as a protective coating of natural packaging material.

The Mastersizer 2000 test showed that the prepared composition contained nano-particles with an average size of 180 nm. This composition comprised the following amounts of ingredients: 1.8 wt. % of nano-cellulose, 2.7 wt. % of processing aids (2.2 wt. % of stearic acid and 0.5% of CaSO4), 26.8 wt. % of biodegradable polymer (DAC), 1.8 wt. % of natural hydrophobizator (stearin), 6.2 wt. % of biodegradable plasticizer (triacetin), 54.5% wt. % of organic solvent, and 6.2 wt. % of water. Brookfield's viscosity of the composition was 340 cP.

Practical Example 3

15 g of brown Kraft cellulose having DP=1100 was cut into pieces of 1 to 3 cm and placed in a 250-ml plastic jar. Sodium hydrogen phosphate was dissolved in 10 wt. % sodium hypochlorite in an amount of 0.5 g per 100 ml of the reagent. The buffered sodium hypochlorite having a pH level of 10 was poured into the jar to obtain a reagent/cellulose ratio of 7.5. The plastic jar was closed hermetically with a cover and was shaken by a lab shaker at 20° C. for 60 min. Then the pretreated cellulose was washed with water in a vacuum glass filter and squeezed to a water/cellulose ratio of 3. The following result was obtained: 43 g of wet cake containing 10.8 g of pretreated cellulose having a white color, DP 360, and a content of carboxyl groups in a concentration of 20 wt. %.

This wet cake was placed into a 300-ml laboratory glass reactor positioned in a silicon oil bath. Then 75 g of 26 wt. % sulfuric acid were added to the wet cake in order to obtain an 18-wt. % concentration of the acid. The reactor was closed hermetically with a cover, heated to 110° C., maintained at this temperature for 40 min, and then cooled. The acidic slurry was transferred to a glass beaker, diluted with water to 10 wt. % sulfuric acid, and squeezed in the glass filter up to a liquid/solid ratio of 3. Then, as a precipitator, a sodium palmitate/CaO mixture 1:1 was slowly added to the acidic wet cake during stirring to a pH level of 8. As a result, the acid was neutralized and the processing aids, palmitic acid as a compatibilizer and calcium sulfate as a white pigment, were formed and precipitated into the wet cake.

The wet cake containing agglomerates of nano-cellulose and processing aids was added to a 500-g solution containing 30 wt. % of Polycaprolactone (PCL), 10 wt. % of PVAc, 2 wt. % of Carnauba wax as a natural hydrophobizator, and 5% of diacetin as a biodegradable plasticizer in an organic solvent-ethyl acetate/acetone mixture of 1:1. Then this mixture was disintegrated by means of Gaulin-type homogenizers with 10 circulations at 100 MPa to obtain a biodegradable composition for use as a protective coating of natural packaging material.

The Mastersizer 2000 test showed that the prepared composition contained nano-particles with an average size of 150 nm. This composition comprised the following amounts of ingredients: 1.6 wt. % of nano-cellulose, 2 wt. % of processing aids (1.6 wt. % of Palmitic acid and 0.4% of CaSO4), 36.3 wt. % of biodegradable polymers (PCL/PVAc), 1.8 wt. % of natural hydrophobizator (Carnauba wax), 4.5 wt. % of biodegradable plasticizer (diacetin), 48% wt. % of organic solvent, and 5.8 wt. % of water. Brookfield's viscosity of the composition was 300 cP.

Practical Example 4

15 g of brown Kraft cellulose having DP=1100 was cut into pieces of 1 to 3 cm and placed in a 250-ml plastic jar. Sodium bicarbonate was dissolved in 10 wt. % sodium hypochlorite in an amount of 0.2 g per 100 ml of the reagent. The buffered sodium hypochlorite having a pH level of 9 was poured into the jar to obtain a reagent/cellulose ratio of 9. The plastic jar was closed hermetically with a cover and was shaken by means of a lab shaker at 20° C. for 40 min. Then the pretreated cellulose was washed with water in a vacuum glass filter and squeezed to a water/cellulose ratio of 3. The following result was obtained: 44 g of wet cake containing 11.0 g of pretreated cellulose having a white color, DP 410, and a content of carboxyl groups in a concentration of 18 wt. %.

This wet cake was placed into a 300-ml laboratory glass reactor positioned in a silicon oil bath. Then 76 g of 15 wt. % hydrochloric acid were added to the wet cake in order to obtain a 10 wt. % concentration of the acid. The reactor was closed hermetically with a cover, heated to 120° C., maintained at this temperature for 60 min., and then cooled. The acidic slurry was transferred to a glass beaker, diluted with water to 5 wt. % acid, and squeezed in the glass filter to a liquid/solid ratio of 3. Then, as a precipitator, sodium stearate was slowly added to the acidic wet cake during stirring to a pH level of 8. As a result, the acid was neutralized and the processing aid, stearic acid as a compatibilizer, was formed and precipitated into the wet cake.

The wet cake containing agglomerates of nano-cellulose and processing aids was added to a 500-g solution containing 25 wt. % of Polycaprolactone (PCL), 25 wt. % of DAC, 1.5 wt. % of Candelilla wax as a natural hydrophobizator, 5% of glycol diacetate (GDA) as a biodegradable plasticizer in an organic solvent-ethyl acetate/acetone mixture of 1:1. Then this mixture was disintegrated by means of Gaulin-type homogenizers with 10 circulations at 100 MPa to obtain a biodegradable composition for use as a protective coating of natural packaging material.

The Mastersizer 2000 test showed that the prepared composition contained nano-particles with an average size of 200 nm. This composition comprised the following amounts of ingredients: 1.8 wt. % of nano-cellulose, 2 wt. % of processing aids (stearic acid), 44.6 wt. % of biodegradable polymers (PCL/DAc), 1.3 wt. % of natural hydrophobizator (Candelilla wax), 4.5 wt. % of biodegradable plasticizer (GDA), 40% wt. % of organic solvent, and 5.9 wt. % of water. Brookfield's viscosity of the composition was 300 cP.

Comparative Example 1

In this example, a microcrystalline cellulose was prepared by a known method with the use of microcrystalline cellulose.

15 g of brown Kraft cellulose having DP=1100 was cut into pieces of 1 to 3 cm, and was placed into a 300-ml laboratory glass reactor positioned in a silicon oil bath. Then 150 g of 30 wt. % sulfuric acid were added. The reactor was closed hermetically with a cover, heated to 80° C., maintained at this temperature for 30 min., and then cooled. The acidic slurry was transferred to a glass beaker, diluted with water to 10 wt. % acid, and squeezed in the glass filter to a liquid/solid ratio of 3. Then, sodium stearate, as the precipitator, was slowly added to the acidic wet cake during stirring to a pH level of 8. As a result, the sulfuric acid was neutralized and the processing aid, stearic acid, as a compatibilizer, was formed and precipitated into the wet cake.

The wet cake was added to a 500-g solution containing 50 wt. % of polyvinyl acetate, 2 wt. % of beeswax as a natural hydrophobizator, and 5% of glycol diacetate (GDA) as a biodegradable plasticizer in an organic solvent such as ethyl acetate. Then this mixture was disintegrated by means of Gaulin-type homogenizers with 10 circulations at 100 MPa to obtain a biodegradable composition for use as a protective coating of natural packaging material.

The Mastersizer 2000 test showed that the prepared composition without the pretreatment step did not contain nano-particles but did contain micro-scale particles with an average size of 6 microns.

Comparative Example 2

In this example, a microcrystalline cellulose was prepared by a known method with the use of microcrystalline cellulose.

15 g of brown Kraft cellulose having DP=1100 was cut into pieces of 1 to 3 cm and was placed into a 300-ml laboratory glass reactor positioned in a silicon oil bath. Then 150 g of 10 wt. % hydrochloric acid were added. The reactor was closed hermetically with a cover, heated to 115° C., maintained at this temperature for 60 min., and then cooled. The acidic slurry was transferred to a glass beaker, diluted with water to 5 wt. % acid, and squeezed in the glass filter to a liquid/solid ratio of 3. Then, sodium stearate, as a precipitator, was slowly added to the acidic wet cake during stirring to a pH level of 8. As a result, the hydrochloric acid was neutralized and the processing aid, stearic acid, as a compatibilizer, was formed and precipitated into the wet cake.

The wet cake was added to a 500-g solution containing 50 wt. % of Polycaprolactone/Polyvinyl Acetate 1:1, 2 wt. % of beeswax as natural hydrophobizator, 5% of glycol diacetate (GDA) as biodegradable plasticizer in an organic solvent such as ethyl acetate. Then this mixture was disintegrated by means of Gaulin-type homogenizers with 10 circulations at 100 MPa to obtain a biodegradable composition for use as a protective coating of natural packaging material.

The Mastersizer 2000 test showed that the prepared composition without the pretreatment step did not contain nano-particles but did contain micro-scale particles with an average size of 10 microns.

Practical Example 5

Kraft paper having a specific weight of 80 g/m$^2$ was coated with the nano-composition (prepared according to the procedure described in Example 1) by means of rod-type lab coater and dried at 100° C. for 10 to 20 min. to weight of the dry coating was 20 g/m$^2$.

Practical Example 6

Kraft paper cardboard having a specific weight of 250 g/m$^2$ was coated with the nano-composition (prepared according to procedure described in Example 2) by means of rod-type lab coater and dried at 100° C. for 10 to 20 min. to weight of the dry coating was 15 g/m$^2$.

Practical Example 7

A starch-based packaging composite was coated with the nano-composition (prepared according to procedure described in Example 4) by means of rod-type lab coater and dried at 100° C. for 10 to 20 min. to weight of the dry coating was 40 g/m$^2$.

Comparative Example 3

Kraft paper having a specific weight of 80 g/g/m$^2$ was coated with the known micro-composition (see Comparative Example 1) by means of rod-type lab coater and dried at 100° C. for 10 to 20 min. to weight of the dry coating was 20 g/m$^2$.

Comparative Example 4

A starch-based packaging composite was coated with the known micro-composition (see Comparative Example 2) by means of rod-type lab coater and dried at 100° C. for 10 to 20 min. to weight of the dry coating was 40 g/m$^2$.

Shown in Table 1 are the results of water penetration (Cobb test for 30 min.), grease resistance (3 Kit test number or degree), and biodegradability time (BDT)—full weight loss during composting in wet soil.

TABLE 1

| Example | Particle size (nm) in Coating Composition | Coating Weight (g/m$^2$) | Cobb Test (gH2O/m$^2$) | Grease-resistance (Degree) | BDT (Months) |
| --- | --- | --- | --- | --- | --- |
| Pr. Ex. 5 | 240 | 20 | 18 | 12 | 2 |
| Pr. Ex. 6 | 180 | 15 | 21 | 12 | 3 |
| Pr. Ex. 7 | 200 | 40 | 27 | 10 | 2 |

TABLE 1-continued

| Example | Particle size (nm) in Coating Composition | Coating Weight (g/m²) | Cobb Test (gH2O/m²) | Grease-resistance (Degree) | BDT (Months) |
|---|---|---|---|---|---|
| Comp. Ex. 3 | 6000 | 20 | 62 | 8 | 2 |
| Comp. Ex. 4 | 10000 | 40 | 75 | 5 | 2 |

As shown in Table 1, nano-compositions prepared with the pretreatment step, protect the natural packaging materials against water and grease, while micro-compositions prepared without the pretreatment step and containing coarse micron-scale particles have poor barrier properties. Moreover, natural packaging materials coated with the proposed nano-compositions are biodegradable and decompose fully for two to three months when composting in wet soil.

The invention claimed is:

1. A method for manufacturing a protective coating composition containing nano-cellulose particles comprising the following steps:
    (a) pretreating cellulose with a sodium hypochlorite solution having pH in the range of 8 to 11 thus obtaining a pretreated cellulose;
    (b) hydrolyzing the pretreated cellulose with a boiling mineral acid having a concentration of 10 to 30 wt. % thus obtaining an acidic wet cake that contains agglomerates of nano-cellulose particles and a residual mineral acid;
    (c) introducing at least one precipitator into the obtained acidic wet cake containing agglomerates of nano-cellulose particles, the precipitator forming with the residual mineral acid water-insoluble processing aids that precipitate into the acidic wet cake and reducing acidity of the acidic wet cake to the pH range of 7 to 8;
    (d) admixing the wet cake, which contains the agglomerates of the nano-cellulose particles and water-insoluble processing aids, with a solution containing a hydrophobic biodegradable polymer, additives of a biodegradable plasticizer, and a natural hydrophobizator soluble in organic solvents; and
    (e) homogenizing the obtained mixture of the wet cake that contains agglomerates of nano-cellulose particles, the water-insoluble processing aids, the solution containing the hydrophobic biodegradable polymer, the additives of biodegradable plasticizer, and the natural hydrophobizator in order to break out agglomerates of nano-particles and to obtain a uniform composition having an average particle size in the range 50 to 300 nm.

2. The method according to claim 1, wherein the concentration of sodium hypochlorite in said sodium hypochlorite solution in the step of pretreating the cellulose ranges from 5 to 10 wt. % at a liquid to solid weight ratio of 5/1 to 10/1 at a temperature of 20 to 40° C. for 30 to 90 min. and in the presence of 0.1 to 0.5 wt. % of a basic buffering agent selected from the group consisting of sodium bicarbonate, sodium hydrogen phosphate, or a mixture thereof providing a pH level of 8 to 10.

3. The method according to claim 1, wherein the step of pretreating cellulose is carried out to content of carboxyl groups in the range of 6 to 25 wt. %.

4. The method according to claim 2, wherein the step of pretreating cellulose is carried out to content of carboxyl groups in the range of 6 to 25 wt. %.

5. The method according to claim 1, wherein the step of pretreating cellulose is carried out to a weight-average degree of polymerization in the range of 300 to 600.

6. The method according to claim 2, wherein the step of pretreating cellulose is carried out to a weight-average degree of polymerization in the range of 300 to 600.

7. The method according to claim 3, wherein the step of pretreating cellulose is carried out to a weight-average degree of polymerization in the range of 300 to 600.

8. The method according to claim 4, wherein the step of pretreating cellulose is carried out to a weight-average degree of polymerization in the range of 300 to 600.

9. The method according to claim 1, wherein the step of hydrolyzing is carried out for 30 to 60 min out with the use of an acid selected from the group consisting of sulfuric acid, hydrochloric acid, and a mixture thereof at a liquid to solid weight ratio of 7/1 to 15/1 and at a temperature of 80 to 120° C.

10. The method according to claim 7, wherein the step of hydrolyzing is carried out for 30 to 60 min out with the use of an acid selected from the group consisting of sulfuric acid, hydrochloric acid, and a mixture thereof at a liquid to solid ratio of 7/1 to 15/1 and at a temperature of 80 to 120° C.

11. The method according to claim 8, wherein the step of hydrolyzing is carried out for 30 to 60 min out with the use of an acid selected from the group consisting of sulfuric acid, hydrochloric acid, and a mixture thereof at a liquid to solid ratio of 7/1 to 15/1 and at a temperature of 80 to 120° C.

12. The method according to claim 1, wherein the precipitator is admixed to the acidic wet cake in an amount that provides gram-equivalent of the precipitator, which is equal or higher than gram-equivalent of the residual acid in the acidic wet cake.

13. The method according to claim 7, wherein the precipitator is admixed to the acidic wet cake in an amount that provides gram-equivalent of the precipitator, which is equal to or higher than gram-equivalent of the residual acid in the acidic wet cake.

14. The method according to claim 8, wherein the precipitator is admixed to the acidic wet cake in an amount that provides gram-equivalent of the precipitator, which is equal or higher than gram-equivalent of the residual acid in the acidic wet cake.

15. The method according to claim 1, wherein the precipitator is selected from the group consisting of the salts of fatty acids, oxides, hydroxides, carbonates, basic silicates, and any mixture thereof.

16. The method according to claim 15, wherein the salts of fatty acids are based on the aids selected from the group consisting of stearic acid, palmitic acid, caprylic acid, lauric acid, and any mixture thereof.

17. The method according to claim 15, wherein the precipitator comprise a cation selected from the cations of sodium, potassium, magnesium, calcium, barium, and a combination thereof.

18. The method according to claim 15, wherein the water-insoluble processing aids have functions that are characteristic for compatibilizers, antiblocking agents, lubricants, pigments, pH-adjusters, or a combination thereof.

19. The method according to claim 1, wherein the hydrophobic biodegradable polymer is selected from the group consisting of polycaprolactone, polyvinyl acetate, diacetate cellulose, and any mixture thereof.

20. The method according to claim 19, wherein the weight-average degree of polymerization of the hydrophobic biodegradable polymer is in the range of 100 to 300.

21. The method according to claim 1, wherein the concentration of the hydrophobic biodegradable polymer in an organic solvent ranges from 20 to 60 wt. %.

22. The method according to claim 20, wherein the concentration of the hydrophobic biodegradable polymer in an organic solvent ranges from 20 to 60 wt. %.

23. The method according to claim 1, wherein the additive that is admixed to the solution of hydrophobic biodegradable polymer is selected from the group consisting of a plasticizer, hydrophobizator, and a combination thereof.

24. The method of claim 7, wherein the additive that is admixed to the solution of hydrophobic biodegradable polymer is selected from the group consisting of a plasticizer, hydrophobizator, and a combination thereof.

25. The method of claim 8, wherein the additive that is admixed to the solution of hydrophobic biodegradable polymer is selected from the group consisting of a plasticizer, hydrophobizator, and a combination thereof.

* * * * *